April 6, 1954     M. R. JONES     2,674,436
VALVE
Filed Dec. 27, 1948     2 Sheets-Sheet 1
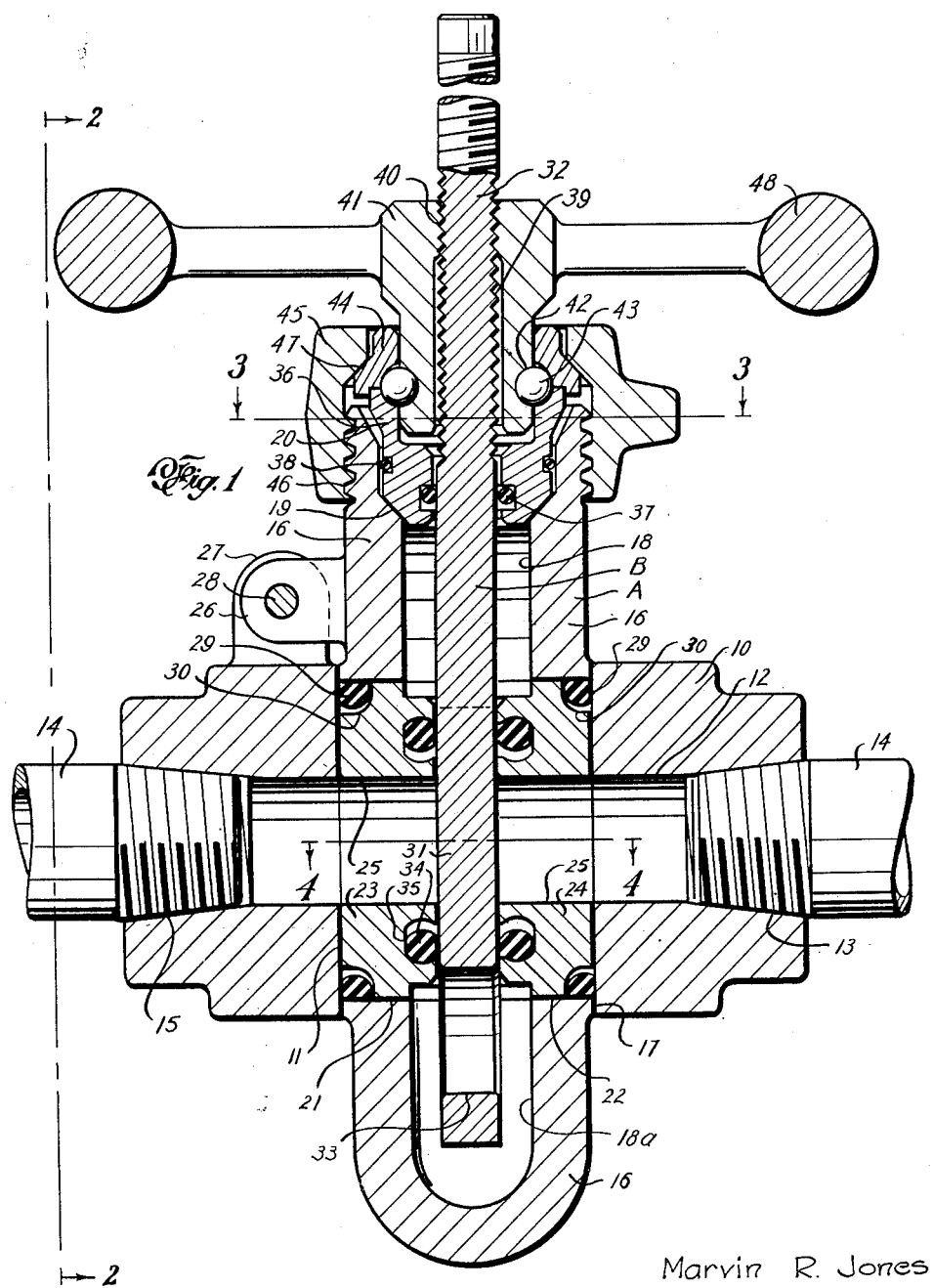
Marvin R. Jones
INVENTOR
BY J. Vincent Martin
and
Joe E. Edwards
ATTORNEYS April 6, 1954
M. R. JONES
2,674,436
VALVE
Filed Dec. 27, 1948
2 Sheets-Sheet 2
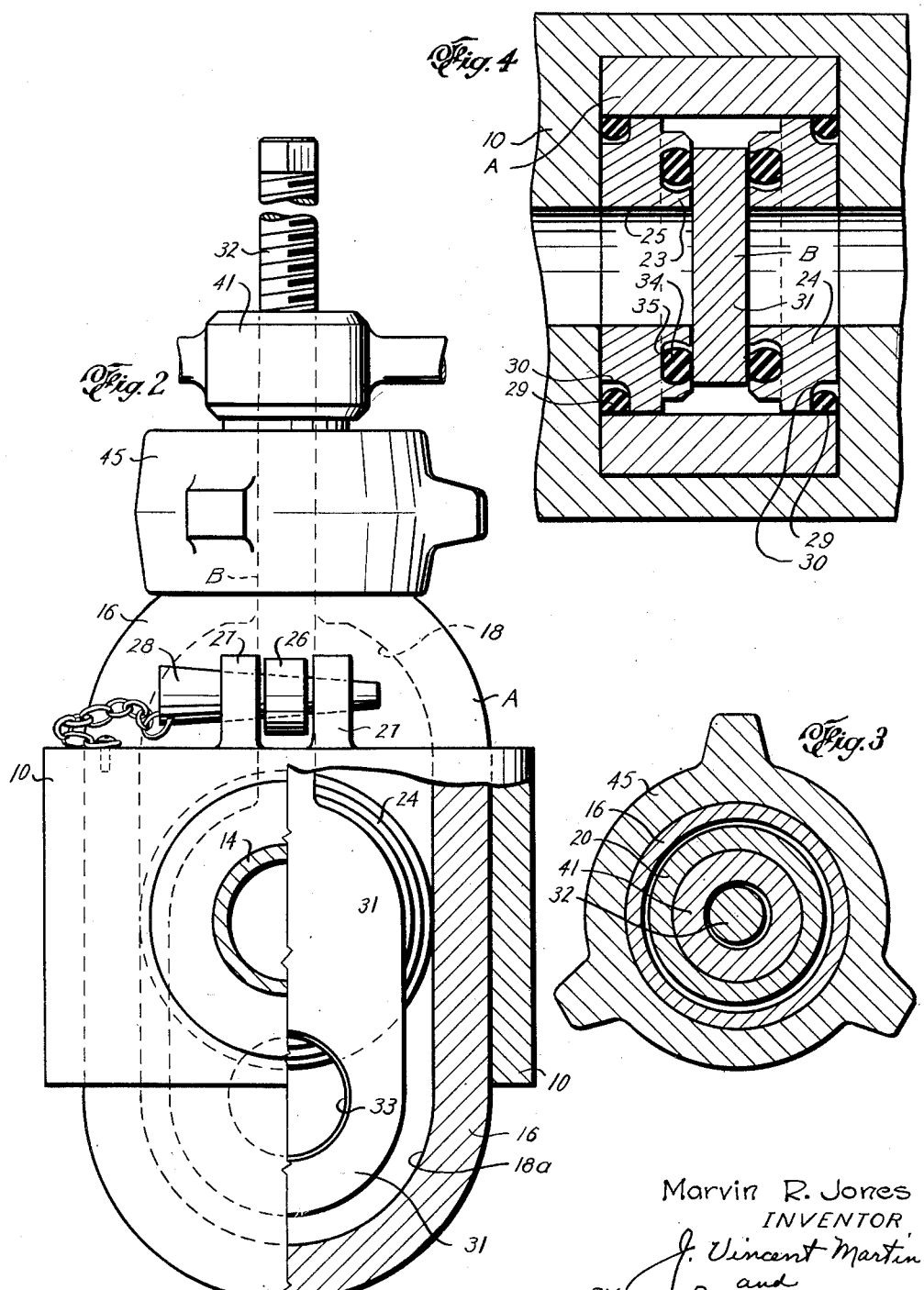
Marvin R. Jones
INVENTOR
BY J. Vincent Martin
and
Joe E. Edwards
ATTORNEYS Patented Apr. 6, 1954

2,674,436

UNITED STATES PATENT OFFICE 2,674,436

VALVE

Marvin R. Jones, Houston, Tex., assignor to Oil Center Tool Company, Houston, Tex., a corporation of Texas Application December 27, 1948, Serial No. 67,408

4 Claims. (Cl. 251—267)

This invention relates to new and useful improvements in valves.

The invention relates particularly to heavy duty valves such as are employed for controlling the flow through the flow lines or pipes which conduct the relatively heavy drilling mud or fluid used in well drilling operations.

One object of the invention is to provide an improved valve wherein the main operating parts of the valve are constructed of a unitary assembly which is adapted to be mounted within a body or manifold connected in the flow line, whereby removal and replacement of the entire assembly may be quickly and easily made without the necessity of disassembling any of the working parts of said valve.

An important object of the invention is to provide an improved valve, which consists of a unitary assembly including a movable valve element, together with a manifold or body which is connected in the flow line and which is adapted to removably receive the unitary assembly; mounting of the assembly within the manifold locating the valve element in a position to control flow through the flow line and the removability of said assembly facilitating the replacement of the assembly when parts thereof become worn.

A further object is to provide an improved valve, of the character described, having means for efficiently sealing between the removable unitary valve assembly and the manifold or body when said assembly is in position within said body, whereby leakage at the joint between the assembly and body is prevented.

Another object is to provide an improved valve, of the character described, wherein the valve seat members which co-act with the movable valve element to effect closure of the valve are readily removable from the unitary valve assembly, whereby replacement of the seat members is facilitated.

A still further object of the invention is to provide an improved valve wherein a gate valve element is movable to open and closed position by the rotation of an operating bushing, together with an improved mounting for said bushing whereby the bushing may be easily rotated to actuate the valve and also whereby excessive wear of said bushing is minimized.

The construction designed to carry out the invention will be hereinafter described together with other features of the invention.

The invention will be more readily understood from a reading of the following specification and by reference to the accompanying drawings, wherein an example of the invention is shown, and wherein:

Figure 1 is a transverse, vertical, sectional view of a valve, constructed in accordance with the invention, Figure 2 is an elevation of the valve, taken on the line 2—2 of Figure 1, Figure 3 is a horizontal, cross-sectional view, taken on the line 3—3 of Figure 1, and Figure 4 is a horizontal, cross-sectional view, taken on the line 4—4 of Figure 1.

In the drawings, the numeral 10 designates a housing or manifold which is formed with a vertical bore 11 extending entirely therethrough. A lateral passage 12 which has its axis at substantially a right angle to the axis of the bore 11 extends through the housing and intersects said bore. One end 13 of the passage 12 which may be referred to as the inlet end is internally screw threaded and connected with a flow line 14, while the opposite or outlet end 15 of said passage is also connected to the flow line 14. Thus, flow through the line or pipe 14 is conducted through the passage 12 of the manifold, and it is apparent that the housing or manifold is more or less permanently connected in said line.

In order to control the flow through the passage 12, a unitary valve assembly A which in Figures 1 to 4 is illustrated as a gate valve, is adapted to be mounted within the housing or manifold 10 and this assembly includes a substantially cylindrical valve body 16 which has the central portion 17 of its external diameter of a size to slidably fit within the axial bore 11 of the housing or manifold. The lower end of the body 16 is closed and said body has an axial bore 18 which extends downwardly from the open upper end of the body. The central and lower portions of the body have an enlarged transversely disposed cavity or recess 18a which has its upper end communicating with the axial bore 18. The upper portion of the bore 18 is enlarged to provide an inclined bevelled seat 19 within the bore of the body and spaced above the slat 19, the bore of the body is flared outwardly as indicated at 20. Diametrically opposed circular openings 21 and 22 are formed in the central portion of the body and as is clearly shown in Figure 1, the openings 21 and 22 extend outwardly from the cavity 18a of the body and communicate therewith.

Cylindrical valve seat members 23 and 24 are adapted to be mounted within the openings 21 and 22 within the valve body 16, and these members are identical in construction, each member including an axial bore 25 which is of substantially the same diameter as the diameter of the passage 12 in the manifold 10. The valve body 16 of the assembly A is insertable within the axial bore 11 of the housing or manifold 10 and is arranged to be positioned therein by means of an outwardly extending aligning lug or projection 26 which is preferably formed integral with the upper portion of the body 16. The lug or projection is arranged to be disposed between upstanding ears 27 formed on the housing or manifold and has an opening 26 which aligns with openings 27a in the ears 27. A tapered bolt 28 is arranged to be driven into the aligned openings 26a and 27a and functions to lock the housing A in its position within the housing or manifold. The aligned openings are so arranged that when the tapered bolt is in position therein, the body is properly located within the housing. When the assembly A is in proper position within the housing or manifold, the valve seat members 23 and 24 of the assembly A have their bores 25 aligned with the passage 12 of said manifold and thus, a flow through the line 14 may occur through the passage 12 and the bores 25 of the valve seat.

For packing off or sealing the joint between the assembly A and the bore 11 of the manifold, as well as sealing the joint between each valve seat member and the openings 21 and 22 in the valve body 10, sealing rings 29 are disposed in annular recesses 30 formed at the outer peripheral portion of each of the seat members 23 and 24. As illustrated, in Figure 1, the sealing rings 29 seal the joint between the assembly A and also prevent a leakage between each valve seat member and its respective opening 21 or 22.

For opening and closing flow through the passage 12 and bores 25 of the seat members, a gate valve element B is movable axially within the bore and cavity of the housing. The element B includes a flat spade portion or gate 31 and a cylindrical stem 32 which is preferably made integral with and extends upwardly from the gate. The flat gate is movable in the cavity 18a between the seat members 23 and 24 and is formed with a circular opening 33 in its lower portion. An effective seal between each seat member 23 and 24 and the surface of the gate 31 is effected by annular sealing rings 34 which are disposed within annular recesses 35 provided in the seat members. The sealing rings 34, as well as the sealing rings 29, may be of the usual O-ring type. When the gate 31 is in its lower position, the opening 33 in its lower portion is located in a plane below the bores 25 of the seat members and the passage 12 with the result that flow through the passage is shut off. When the gate valve element B is raised or moved upwardly, the opening 33 in the lower portion of the gate 31 is aligned with the bores 25 of the seat members, and said opening is preferably of substantially the same diameter as said bores, with the result that when the gate valve is raised, a full opening passage through the device is had.

The stem 32 of the gate valve element B extends upwardly through a lower bearing race collar 36 which is seated upon the internal seat 19 within the upper portion of the valve body. A sealing ring 37 surrounds the stem and packs off between the collar 36 and said stem, while a similar sealing ring 38 seals off between the external surface of the collar and the bore of the valve body 16. Above the lower bearing race collar 36, the valve stem is formed with external screw threads 39 which have engagement with internal threads 40 of an operating bushing 41. The bushing 41 has its lower end extending into the upper portion of the lower bearing race collar 36 and is provided with an external annular groove 42 which forms a bearing raceway for a plurality of ball bearings 43. The bearings engage the lower race collar 36 and also engage within the raceway 42 and said bearings are retained in position by an upper bearing race ring 44 which surrounds the lower portion of the operating bushing 41 above the ball bearings 43. The upper race or retaining ring 44 is flanged at its lower end to engage the upper end of the lower race collar 36 and when in engagement with said collar, ample clearance is provided for a free rotation of the ball bearings 43. The upper race ring 44 is retained in position by means of a quick coupling collar 45 which is connected by relatively coarse threads 46 with the upper end of the valve body 10, the interior of the coupling collar and the outer surface of the ring 44 being provided with complementary bevelled engaging surfaces 47.

It will be apparent that the operating bushing 41 is freely rotatable on the ball bearings 43 and said bushing may have a hand wheel 48 secured thereto to facilitate manual rotation of the bushing. When the bushing is rotated, the co-action between the threads 40 of the bushing and the threads 39 of the stem will result in a movement of the stem and the gate valve 31 within the housing 16. Thus, the bushing provides a means whereby the valve element B may be readily operated to align the opening 33 in its gate with the passage 12 to open the valve; similarly, movement of the valve element B in an opposite direction to lower the opening 33 of the gate to the position shown in Figure 1 will result in a closure of the passage 12. Efficient sealing of any pressure within the flow line is effected by the pressure seal rings 29 and 34. Any pressure which might escape into the upper portion of the bore 18 of the valve body 16 will be sealed off around the stem by the sealing ring 37 and around the race collar 36 by the sealing ring 38.

When it becomes necessary to replace any parts of the valve unit, it is only necessary to remove the pin 28 and the entire valve assembly A may be lifted upwardly out of the bore 11 of the housing or manifold 10. This entire assembly may then be replaced with a new assembly, and such new assembly will be properly positioned and aligned by means of the aligning lug or projection 26 engaging between the upstanding ears 27 on the manifold and the positioning of the tapered bolt 28, the latter also locking the assembly in place. It is noted that the insertion of aligning lug 26 between the ears 27 also effects a radial alignment of the housing 16 to assure proper axial alignment of the bores 25 with said passage. After an assembly A has been entirely removed and replaced, the worn assembly may be readily repaired since the valve seat members 23 are freely removable from their respective openings 21 and 22. The bearing arrangement for the stem may be also easily replaced, by merely removing the quick coupling collar 45 which allows not only removal of the bearing assembly but also of the complete gate valve element B. It is apparent that by making the entire valve assembly A a unitary structure, this assembly can be quickly and easily replaced with a new one and it is not necessary to keep the valve in the flow line 14 out of service for an appreciable length of time. In fact, replacement may be made without practically any interruption of flow in the flow line 14. It is noted that the valve seat members 23 and 24 are not fastened or threaded into position within the valve body 16, but are merely retained in proper position within their respective openings by their co-action with the wall of the bore 11 of the manifold. This arrangement facilitates removal of the valve seat members after the assembly A has been withdrawn from the manifold. The entire valve is simple in construction and the disposition of the sealing rings is such that efficient sealing under high pressures is provided even though the valve elements or working parts of the valve are readily accessible and removable for replacement and repair.

The foregoing description of the invention is explanatory thereof and various changes in the size, shape and materials, as well as in the details of the illustrated construction may be made, within the scope of the appended claims, without departing from the spirit of the invention.

Having described the invention, I claim:

1. The combination with a manifold housing which is connected in a flow line and which has a lateral passage communicating with the flow line and a vertical bore extending entirely through and intersecting said passage, of a unitary valve assembly including a valve body insertable within the bore of the housing to extend entirely therethrough and having a transverse passage of larger diameter than the lateral passage in the housing and adapted to have its central portion aligned with said lateral passage when the body is in position in the bore, a gate valve element mounted to move vertically within the body to traverse the transverse passage and movable to positions opening and closing said transverse passage to control flow through the lateral passage of the housing, an annular valve seat member adjacent each side of the gate valve element and disposed adjacent the wall of the transverse passage of the valve body, said valve seat members being retained within the valve body passage by engagement of the wall of the housing bore therewith when the assembly is in position within the housing, a flexible sealing ring between each valve seat member and the wall of the body, and a second flexible sealing ring between each valve seat member and the gate valve element.

2. The combination as set forth in claim 1, together with spaced ears on the manifold housing, a projection on the valve housing adapted to engage between the ears, and a locking pin insertable through both the ears and projection to removably latch the valve body in place within the manifold housing.

3. As a subcombination in a gate valve device having a valve body formed with a bore, an operating means including, an actuating stem extending upwardly through and outwardly from the upper end of the bore of the body and movable axially to the bore, a rotatable bushing mounted in the upper end of the bore of the body surrounding the stem and having a threaded connection with the stem, and a bearing assembly supported within the upper end of the bore and having the rotatable bushing supported therein.

4. The subcombination as set forth in claim 3, wherein the bearing assembly includes a lower race collar mounted on a projecting shoulder within the upper portion of the body, ball bearings resting upon the lower race collar and also engaging the rotatable bushing, an upper race ring engaging the lower race collar and confining the ball bearings, and a quick coupling annular retaining member secured to the valve body and retaining the bearing assembly in position.

References Cited in the file of this patent

UNITED STATES PATENTS

| Number | Name | Date |
| --- | --- | --- |
| 202,319 | Worthen | Apr. 9, 1878 |
| 587,108 | Sherrerd | July 27, 1897 |
| 611,472 | Gillspie | Sept. 27, 1898 |
| 695,838 | Ritchie | Mar. 18, 1902 |
| 1,037,338 | Scott | Sept. 3, 1912 |
| 1,341,146 | Murray | May 25, 1920 |
| 1,697,608 | Patterson | Jan. 1, 1929 |
| 1,805,710 | Wilkins | May 19, 1931 |
| 1,850,850 | Peterson | Mar. 22, 1932 |
| 1,898,935 | Brandriff | Feb. 21, 1933 |
| 2,208,929 | Jaegle | July 23, 1940 |
| 2,301,176 | Elliott | Nov. 10, 1942 |
| 2,360,733 | Smith | Oct. 17, 1944 |
| 2,427,439 | Brown | Sept. 16, 1947 |
| 2,506,129 | Ashton | May 2, 1950 |

FOREIGN PATENTS

| Number | Country | Date |
| --- | --- | --- |
| 180,969 | Great Britain | June 8, 1922 |